Feb. 8, 1966 P. M. TOMARO, JR 3,233,476

VARIABLE SPEED DRIVE MECHANISM FOR PHONOGRAPH TURNTABLE

Filed March 13, 1964 6 Sheets-Sheet 1

INVENTOR.
PATRICK M. TOMARO JR.

BY Nolte & Nolte
ATTORNEYS

Feb. 8, 1966 P. M. TOMARO, JR 3,233,476

VARIABLE SPEED DRIVE MECHANISM FOR PHONOGRAPH TURNTABLE

Filed March 13, 1964 6 Sheets-Sheet 2

INVENTOR.
PATRICK M. TOMARO JR.
BY
Nolte & Nolte
ATTORNEYS

Feb. 8, 1966 P. M. TOMARO, JR 3,233,476

VARIABLE SPEED DRIVE MECHANISM FOR PHONOGRAPH TURNTABLE

Filed March 13, 1964 6 Sheets-Sheet 3

INVENTOR.
PATRICK M. TOMARO JR.

BY

Nolte & Nolte
ATTORNEYS

Feb. 8, 1966 P. M. TOMARO, JR 3,233,476

VARIABLE SPEED DRIVE MECHANISM FOR PHONOGRAPH TURNTABLE

Filed March 13, 1964 6 Sheets-Sheet 4

INVENTOR.
PATRICK M. TOMARO JR.

BY Nolte & Nolte
ATTORNEYS

Feb. 8, 1966 P. M. TOMARO, JR 3,233,476

VARIABLE SPEED DRIVE MECHANISM FOR PHONOGRAPH TURNTABLE

Filed March 13, 1964 6 Sheets-Sheet 5

INVENTOR.
PATRICK M. TOMARO JR.

BY

Nolte & Nolte
ATTORNEYS

Feb. 8, 1966 P. M. TOMARO, JR 3,233,476

VARIABLE SPEED DRIVE MECHANISM FOR PHONOGRAPH TURNTABLE

Filed March 13, 1964 6 Sheets-Sheet 6

INVENTOR.
PATRICK M. TOMARO JR.

BY Nolte & Nolte
ATTORNEYS

United States Patent Office 3,233,476

Patented Feb. 8, 1966

3,233,476

VARIABLE SPEED DRIVE MECHANISM FOR PHONOGRAPH TURNTABLE

Patrick M. Tomaro, Jr., Maplewood, N.J., assignor to The Lionel Corporation, New York, N.Y., a corporation of New York Filed Mar. 13, 1964, Ser. No. 351,771
14 Claims. (Cl. 74—201)

The present invention relates to a multi-speed phonograph drive mechanism and in particular to a mechanism which includes a cam and cam follower assembly which provide vertical and horizontal displacement of an idler wheel adapted to selectively engage the surfaces of stepped portions of a vertically extending motor driven shaft.

It is an object of the present invention to provide an improved multi-speed drive mechanism for driving phonograph turntables.

Another object of the invention is to provide a simplified multi-speed turntable which is reliable in operation and yet relatively inexpensive to manufacture.

Still another object of the invention is to provide an inexpensive and reliable cam and cam follower assembly which laterally moves an idler wheel out of engagement with the surface of a motor driven shaft during vertical movement thereof in a multiple speed phonograph turntable drive mechanism.

The invention as described herein includes an idler wheel adjusted for horizontal and vertical movement to thereby selectively engage and disengage the surfaces of stepped portions of a motor drive shaft. Such movements provide a basis for shifting the speed of a phonograph turntable, utilizing the idler wheel and stepped shaft, between four different speeds. Frictional engagement of the idler wheel with the drive shaft rotates the idler wheel when the motor for the shaft is actuated, the idler wheel being simultaneously in contact with the turntable. The rotation of the idler wheel rotates the turntable in any one of four possible speeds, dependent upon the particular stepped portion which the idler wheel is engaging.

A manually operated knob and attached shaft allow an operator to rotate a cam having two separate camming surfaces to positively move the idler wheel in two directions. The cam is mounted at the end of the knob shaft opposite the knob. The integrally constructed cam includes a peripheral flange having a first camming surface divided into five sections, each one at a different general radial distance from the center of rotation of the cam. The first camming surface slidably engages a pin member mounted on a cam follower assembly in turn slidably and rotatably mounted upon a fixed vertically extending cam follower shaft. The rotation of the cam provides vertical movement of the cam pin, and therefore the cam follower assembly along the cam follower shaft.

The cam flange also includes a second cam surface spaced radially from, and extending along the axis about which the cam rotates. Four notches, corresponding to the four speeds of the phonograph turntable, are included in the second cam surface. A roll pin secured to the cam follower assembly is adapted to engage the flange. As the cam is rotated the roll pin slides along the second cam surface, following the contours of the notches, and causing the cam follower assembly to oscillate about the cam follower shaft.

A link member, upon which the shaft for the idler wheel is mounted, includes a vertically extending link shaft mounted upon one end of the link member. One end of the cam follower assembly is rotatably mounted on the link shaft.

A plurality of springs biases the idler wheel toward the vertically extending motor driven shaft, the cam follower assembly downwardly along the cam follower shaft, and the cam flange toward the roll pin.

Rotation of the knob, to shift the turntable from one speed to the next, rotates and initiates a series of idler wheel movements. Thus, the idler wheel is sequentially disengaged from the motor shaft via a lateral movement, elevated (or lowered depending upon the direction of rotation of the knob) a predetermined distance via a vertical movement and finally brought back into engagement with the shaft via a lateral movement.

Other and further objects of this invention will be apparent from the following description and claims and may be understood by reference to the accompanying drawings, which by way of illustration show preferred embodiments of the invention and what is now considered to be the best mode of applying the principles thereof.

Figure 1:
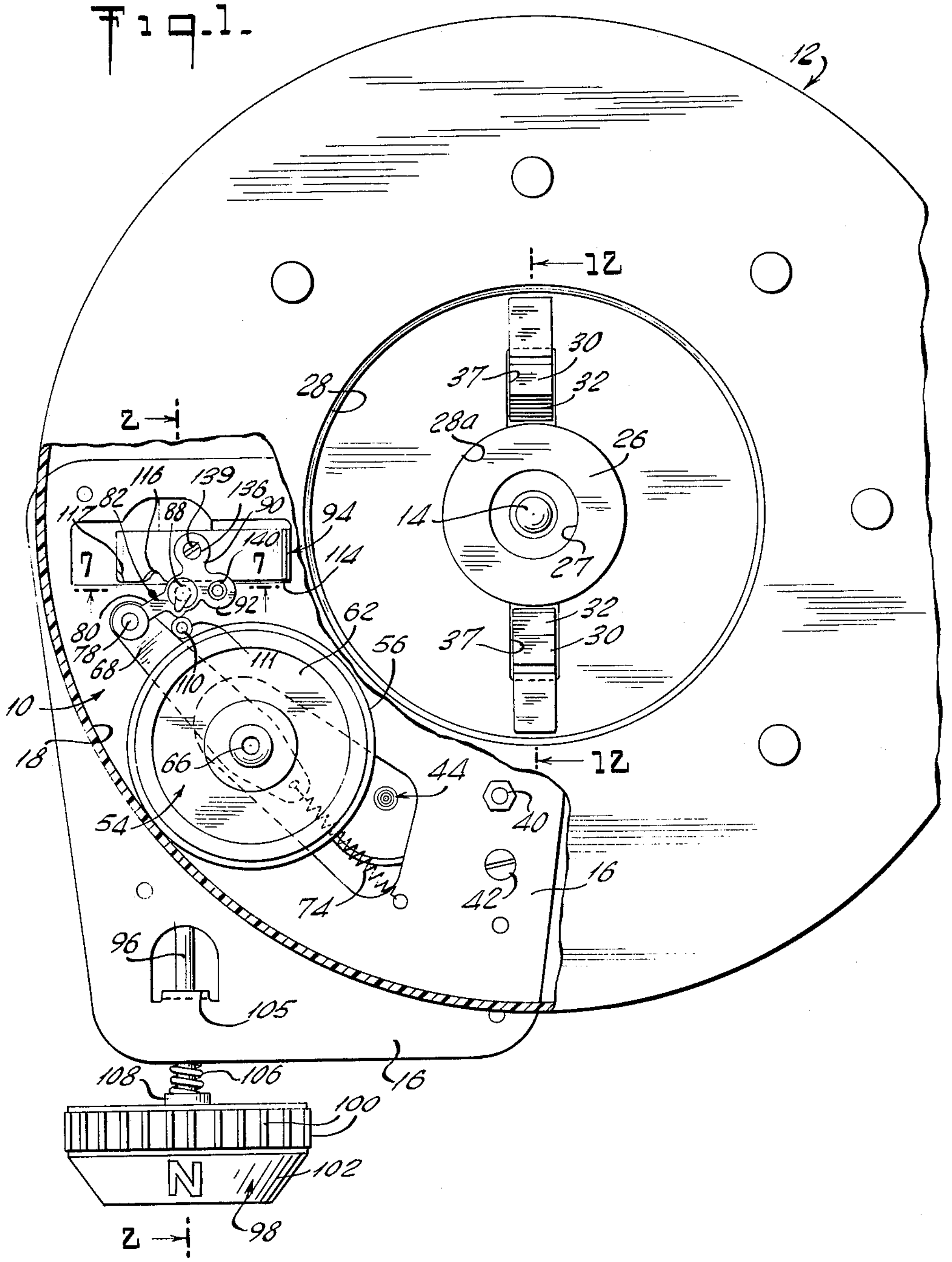
FIG. 1 is a plan view, partially broken away, of a turntable assembly.
Figure 2:
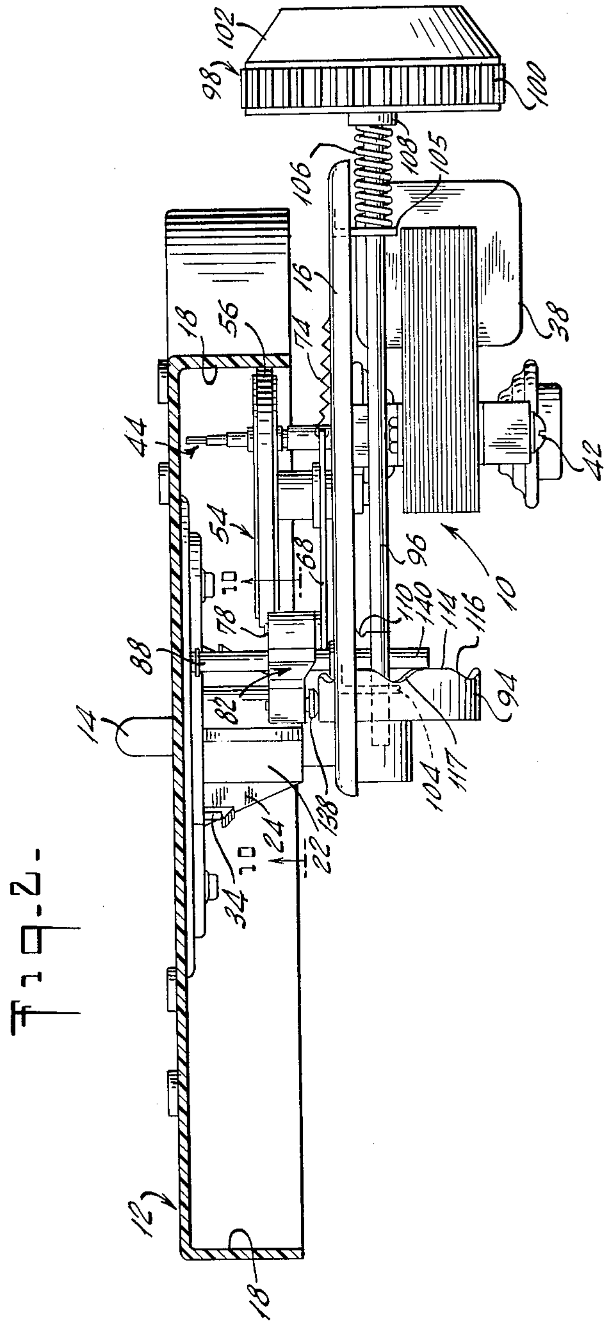
FIG. 2 is a section taken along line 2—2 of FIG. 1.
Figure 3:
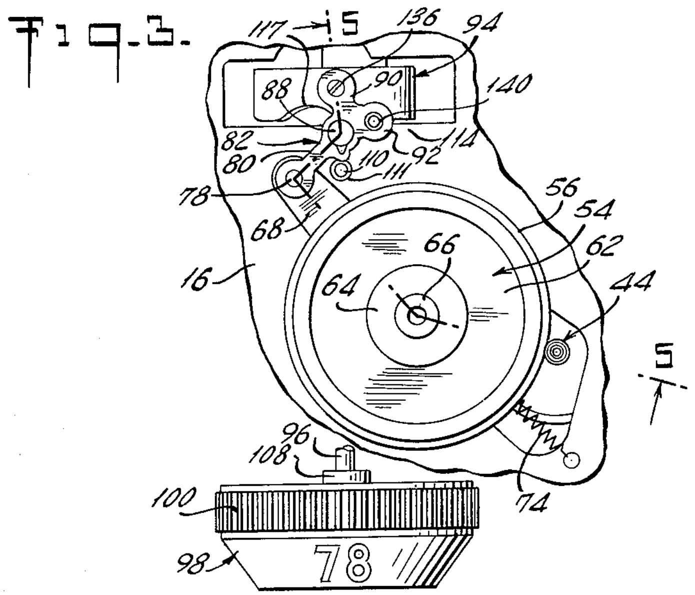
FIG. 3 is a plan view of the idler wheel, knob cam assembly shown in FIG. 1.
Figure 4:
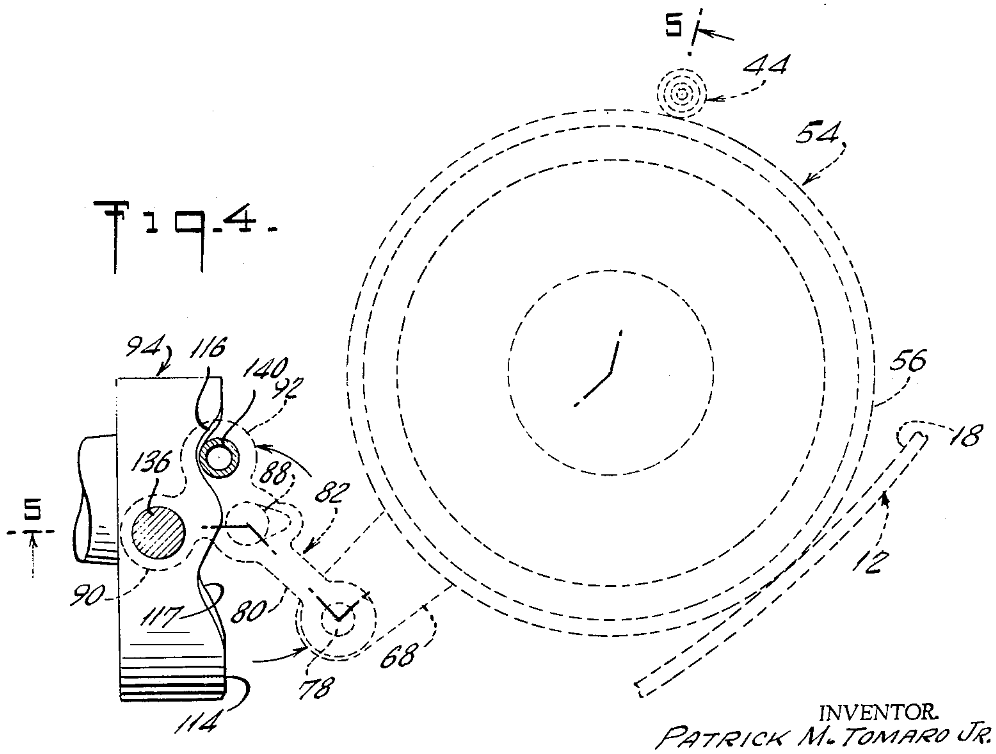
FIG. 4 is a section taken along line 4—4 of FIG. 5.
Figure 5:
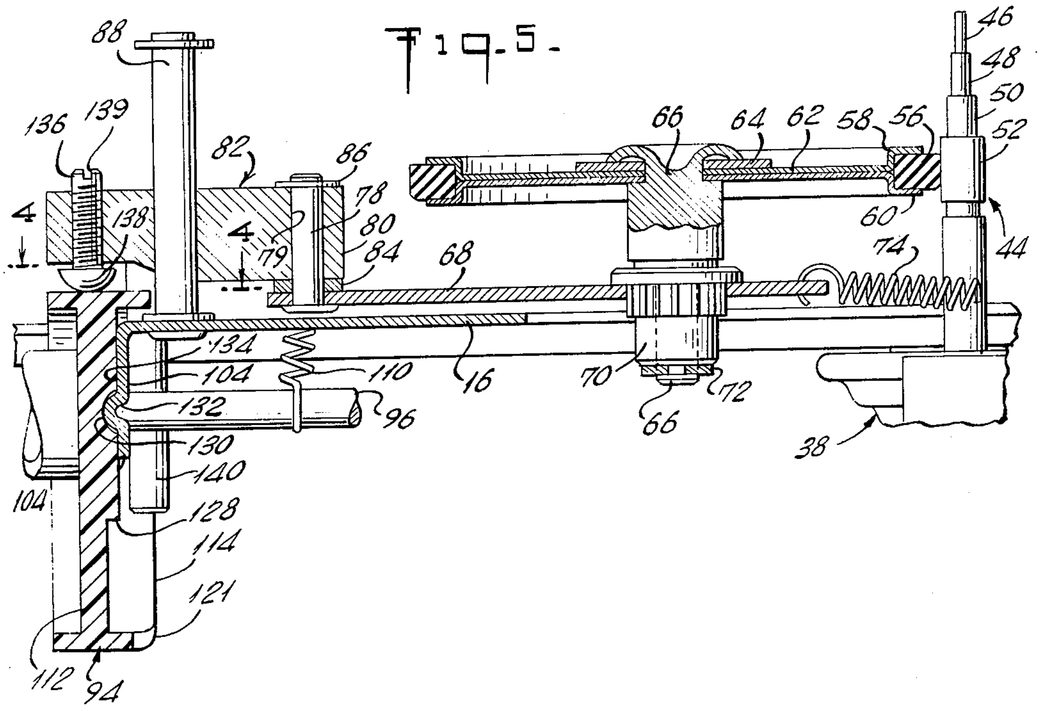
Figure 6:
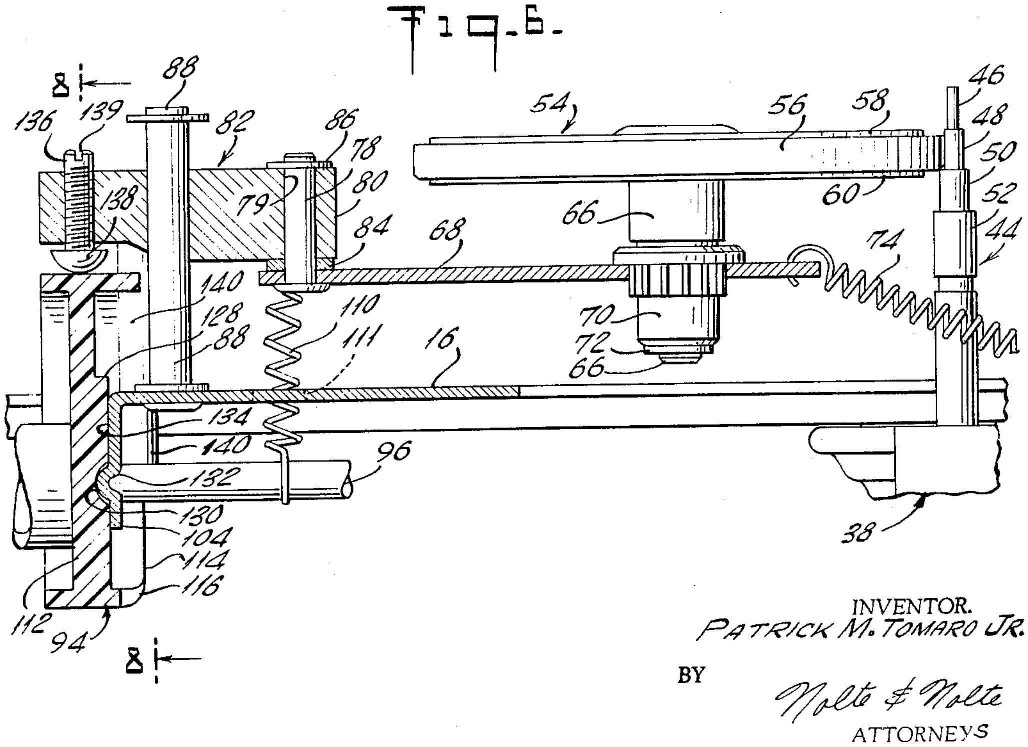
Figure 7:
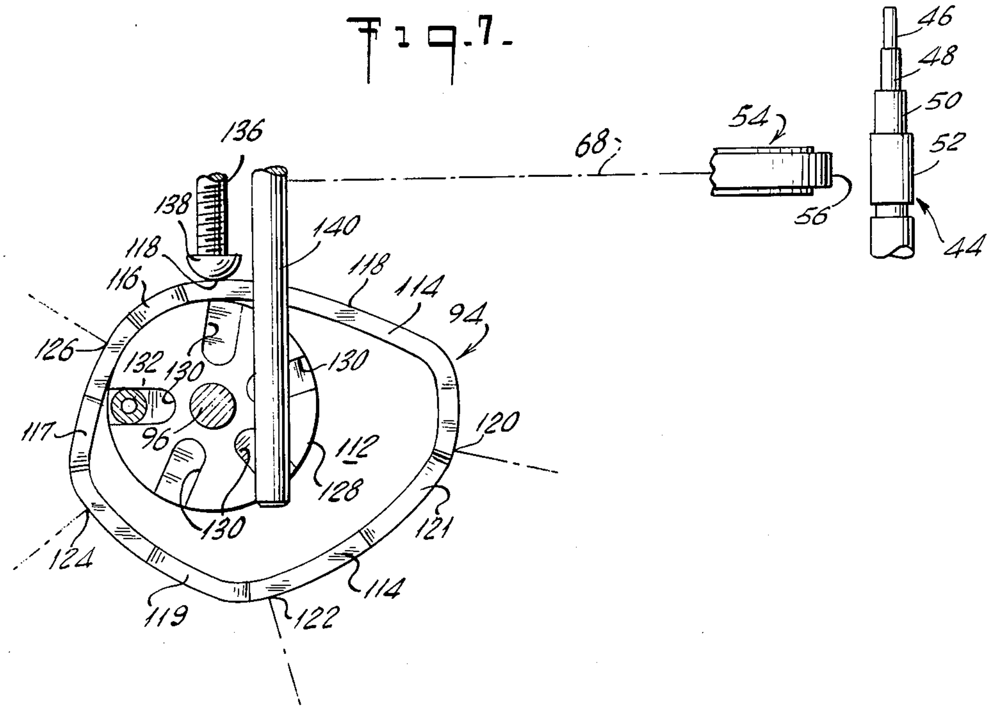
Figure 8:
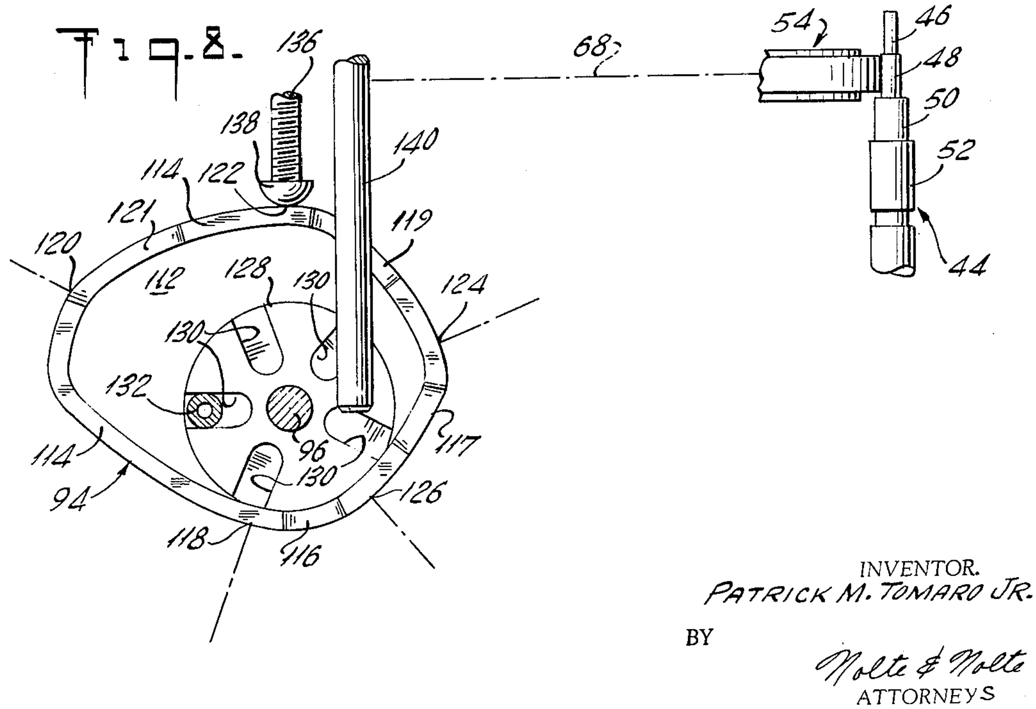
Figure 9:
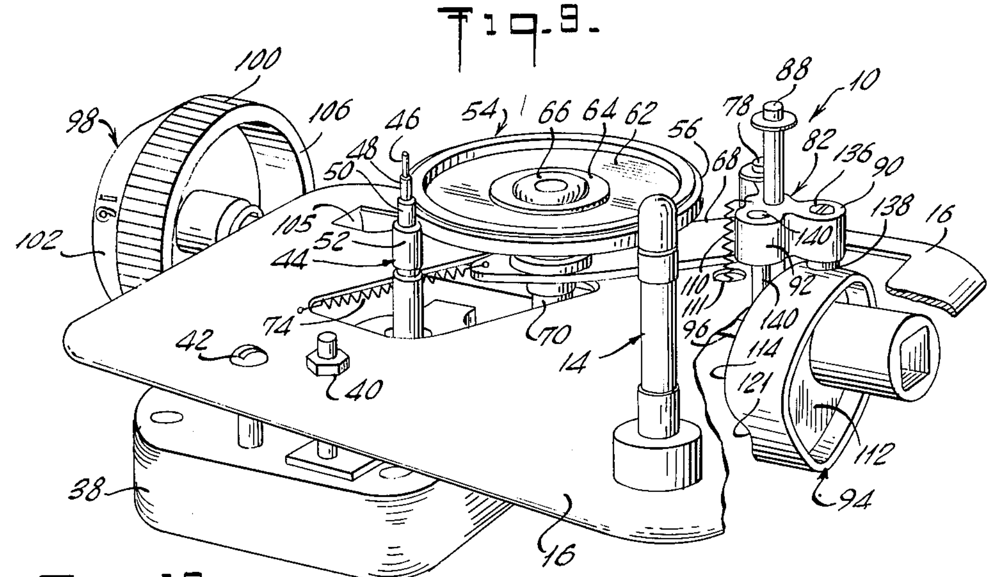
Figure 10:
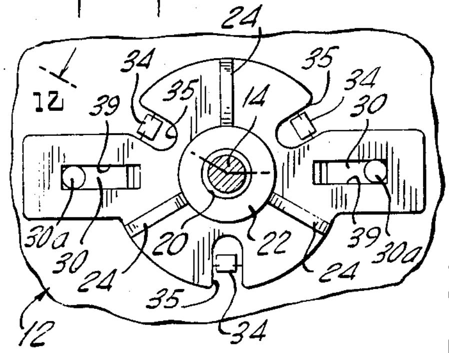
Figure 12:
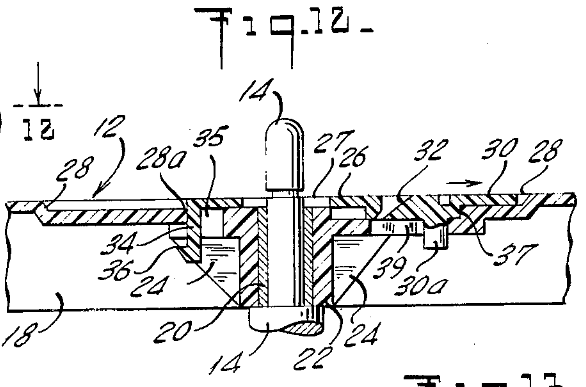
Figure 11:
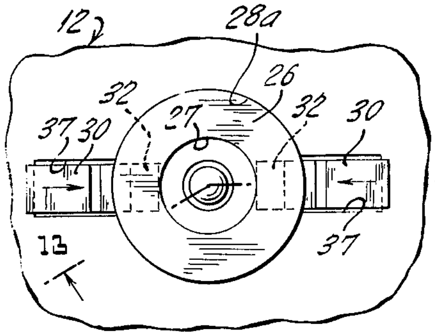

FIG. 5 is a section taken along line 4—4 of FIGS. 3 and 4 showing the turntable in the 78 r.p.m. position;

FIG. 6 is a sectional view similar to FIG. 5 illustrating the 33 r.p.m. position of the turntable drive mechanism;

FIG. 7 is a sectional view taken along line 7—7 of FIG. 1, including a portion of the turntable and drive shaft;

FIG. 8 is a sectional view taken along line 8—8 of FIG. 6, including a portion of the turntable and drive shaft;

FIG. 9 is a perspective view, partially broken away, of the turntable drive mechanism;

FIG. 10 is a sectional view taken along line 10—10 of FIG. 2;

FIG. 11 is a plan view of a portion of the turntable shown in FIG. 1;

FIG. 12 is a sectional view taken along line 12—12 of FIGS. 1 and 10; and

Figure 13:
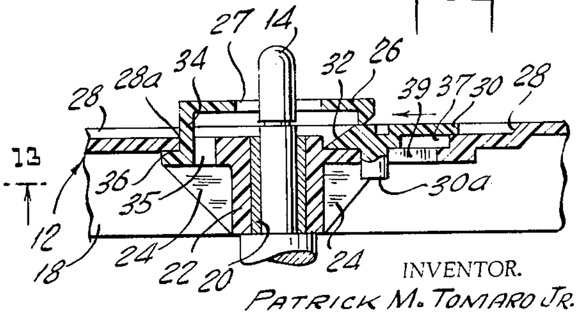

FIG. 13 is a sectional view taken along line 13—13 of FIG. 11.

Referring now more in detail to the drawings, wherein similar reference numerals identify corresponding parts throughout the several views, 10 represents a multi-speed turntable drive mechanism, substantially as shown. A disc-shaped turntable 12, as shown in FIG. 1, is supported for rotation upon an upright turntable shaft 14. The turntable shaft is secured to support plate 16 by any suitable means (not shown). Record turntable 12, including a downwardly depending flange 18 integrally connected thereto, is rotatably mounted on shaft 14. A cylindrical metallic bushing 20 (FIGS. 11–13) is secured to a cylindrically shaped plastic member 22 held by triangularly shaped supports 24 depending downwardly from the bottom surface of turntable 12 to which they are secured in sliding engagement with shaft 14. A circular disc 26, having a centrally located aperture 27, is vertically movable from a first position within depression **28*a*, as shown in FIG. 12, to a second elevated position as shown in FIG. 13, by the inward sliding movement of a pair of buttons 30. A concentric depression 28 surrounds depression 28*a* so that disc 26** normally rests no higher than the lower surface of the record being played.

Buttons 30 include a downwardly slanted surface 32, which face the outer periphery of circular disc 26 in their retracted position. The buttons ride in respective radial tracks 37 which extend outwardly from the periphery of depression 28*a*. Buttons 30 include downwardly depending pins 30*a* which ride in radial guide slots 39. The inward movement of the buttons allows slanted surfaces 32 to engage the periphery of the disc 26. Further inward movement of the buttons forces the disc upwardly as the periphery of the disc slides along the slanted surfaces 32 until it reaches the position shown in FIGS. 11 and 13. The elevated position of the disc allows the engagement therewith of 45 r.p.m. records, which have larger centering apertures than the 16, 33 and 78 r.p.m. records. Legs 34 extend through openings 35 in turntable integrally formed with and depending downwardly from disc 26 include shoulders 36 which engage the bottom surface of turntable 12 and thereby prevent the disc from moving any higher than the position shown in FIG. 13.

A conventional drive motor 38 is secured to the underside of support plate 16, (FIG. 9) by nuts 40 and bolts 42. A capstan or drive shaft 44 extends upwardly from motor 38 and includes at its upper portion a plurality of stepped sections 46, 48, 50 and 52, which may be selectively engaged by an idler wheel 54, as described hereinbelow. Idler wheel 54 also frictionally engages the inner surface of flange 18 of turntable 12, the flange 18 being wide enough to permit engagement by the idler wheel throughout the vertical travel of the idler wheel as it selectively engages stepped sections 46 through 52. A resilient tire member 56 is secured within flanges 58 and 60, integrally formed with side plate 62 of idler wheel 54. A washer 64 secured to idler wheel shaft 66 and in frictional engagement with side plate 62 provides for wobble control of the idler wheel.

Idler wheel 54 is mounted upon a link 68 (FIGS. 5 and 6) intermediate its ends. A bearing 70 is press fit on link 68 and serves as a mounting for the idler wheel shaft 66. Lock washer 72 is provided to hold shaft 66 within bearing 70. A spring 74 is secured by one of its ends to the short section of cantilevered link 68, extending in the general direction of drive shaft 44. The other end of spring 74 is connected to support plate 16 thereby biasing the link and link mounted idler wheel toward drive shaft 44 in a direction so that the idler wheel also engages the inner surface of downwardly depending flange 18 to turntable 12.

A vertical shaft 78 is secured to link 68 at the end opposite the end to which spring 74 is secured. Link shaft 78 is fitted within a cylindrical passage 79 in a leg 80 of a cam follower assembly 82 to provide a sliding engagement therewith. Cam follower 82 also includes legs 90 and 92. A washer 84 is interposed between the bottom of assembly 82 and link 68. Link shaft 78 is peened at the bottom end on the underside of link 68. The peened end of shaft 78 combined with lock washer 86 serves to hold the link shaft within the cylindrical passageway.

Cam follower assembly 82 is journaled on a cam follower shaft 88 which is secured to support plate 16 intermediate leg 80 and legs 90 and 92 (FIG. 1). Cam follower shaft 88 must be positioned perpendicular to the support plate. Since cam follower assembly 82 is pivotable on shaft 88 and leg 80 is pivotable on link shaft 78, the link and idler wheel are moved away from or toward drive shaft 44 when the cam follower rotates about shaft 88.

An integrally formed unitary cam 94 is tightly fitted about one end of knob shaft 96. A suitable control knob 98 is secured to the other end of knob shaft 96 and includes a plurality of bosses 100 about the periphery of the knob to provide better gripping action. A chamfered surface 102 includes indicia in the form of raised numbers corresponding to the speeds at which the record turntable is rotated, and, in addition, the raised letter N to indicate a neutral position for idler wheel 54. Knob shaft 96 is journaled in downwardly depending ears 104 and 105 integrally formed with support plate 16. A coil spring 106 about knob shaft 96 is interposed between ear 105 and bearing 108 of control knob 98, thereby tending to bias knob shaft 96, and consequently cam 94, in a direction toward knob 98. A biasing spring 110 is secured at one end to knob shaft 96 and at the other end to cam follower assembly 82 through aperture 111 in support plate 16, to bias the cam follower assembly in a downward direction along cam follower shaft 88.

Cam 94 is constructed to provide two camming actions axial and radial. The cam is made of a suitable material, such as plastic, which provides smooth camming surfaces. The cam includes a cam plate 112 and a four lobe camming flange 114 integrally formed with, and around the periphery of cam plate 112. The inner rim of flange 114, that is, the rim facing control knob 98, extends laterally a short distance toward the control knob and includes a plurality of notches 116, 117, 119, and 121, cut out of the periphery of the rim of the flange. Camming flange 114 includes five camming surfaces 118, 120, 122, 124 and 126 (FIGS. 7 and 8) corresponding to the neutral, 16 r.p.m, 33 r.p.m., 45 r.p.m., and 78 r.p.m. turnable speeds, at varying radial distances from the center of rotation of cam 94.

A generally circular raised surface 128 is integrally formed with the inner surface of cam plate 112, as shown more clearly in FIGS. 7 and 8. Raised surface 128 includes five detents 130 which correspond to the five positions indicated by the indicia on control knob 98. Raised surface 128 is positioned adjacent ear 104 and in sliding engagement therewith. A detent engaging key 132 is formed on surface 134 of ear 104. As control knob 98 is manually rotated, the raised surface 128 on cam plate 112 also rotates and key 134 is adapted to slide over the raised surface and engage each of the detents 130 against the bias of spring 106 to provide a positive resting position at each of the positions indicated by the indicia on control knob 98.

An adjustable slotted screw 136 having a round head 138 is threadedly engaged in leg 90 of cam follower assembly 82. The end of screw 136 opposite head 138 includes a slot 139 (FIG. 1) to adjust the height of the idler wheel. Since spring 110 provides a constant downward bias on the cam follower assembly, head 138 of screw 136 is in constant sliding engagement with one or the other of camming surfaces 118, 120, 122, 124 and 126, and as the cam is rotated.

The remaining leg 92 of the cam follower assembly includes roll pin 140 tightly positioned within a passage formed in this leg. Roll pin 140 is cylindrically shaped and depends downwardly from leg 92 a distance sufficient to slidingly engage one of notches 116, 117, 119, and 121, as the cam is rotated. Roll pin 140 is continually urged against camming flange 114 because spring 74 pulls on link 68 to rotate cam follower 82 counter-clockwise about pivot 88, thus urging pin 140 against camming surface 114.

Turning now to the operation of the drive mechanism, FIG. 7 depicts the neutral position of the cam and idler wheel 54. In the neutral position, adjustable screw 136 rests against surface 118 with key 132 engaging notch 130 to provide a semi-locking engagement therewith. In the neutral position idler wheel 54 is set at a level with stepped section 52, but in spaced relation thereto. The idler wheel is spaced apart from drive shaft 44 in this position because roll pin 140 is engaged by an extended, or unnotched portion, of the inwardly extending rim of cam flange 114 which has rotated the cam follower assembly clock-wise, thereby pulling leg 80 and link 68 away from drive shaft 44. Spring 110 tends to bias cam assembly 82 downwardly and serves to keep the head of screw 136 in engagement with the cam surface at this point. Since the link and the idler wheel mounted on the link follow the vertical movements of the cam follower assembly, the idler wheel remains at the level corresponding to the neutral position.

As control knob 98 is rotated clock-wise, cam 94 is also rotated clock-wise through the medium of shaft 96. Cam follower 136 follows cam surface 126 and roll pin 140 slides along the inner rim of the camming flange and into notch 116, which corresponds to the 78 r.p.m. position. As roll pin 140 moves into the area of notch 116, spring 74, which had been urging the roll pin against the cam continues to do so and forces the rim of the cam flange to remain in contact with roll pin 140, thereby allowing the roll pin to follow the contour of the notch. Because spring 74 applies a constant bias on link 68, the link and the idler wheel are pulled toward drive shaft 44 and rim 184. As the roll pin enters notch 116, the force exerted by spring 74 causes cam follower assembly 82 to rotate counter-clockwise a small distance about shaft 88 permitting the link, connected to the cam follower assembly through link shaft 78, to move toward the drive shaft. Thus, the rotary movement of the cam is converted into idler wheel movement axially toward the stepped drive shaft 44. The rotating drive shaft 44 is now in frictional engagement with resilient tire member 56 at stepped section 52, corresponding to the 78 r.p.m. position.

Further clock-wise rotation of control knob 98 first tends to pull idler wheel, and therefore tire 56, away from stepped section 52 because roll pin 140 now begins to move along the inclined portion of notch 116 as shown in FIG. 4, thereby rotating cam follower assembly 82 in a clock-wise direction. The clock-wise movement of cam follower assembly 82 urges link shaft 78 axially away from drive shaft 44, idler wheel 54 following. As the control knob continues to be rotated clock-wise, head 138 of screw 136 comes into contact with camming surface 124. Because camming surface 124 is at a greater radial distance from the axis, about which the cam rotates, than is camming surface 126, as the surface 124 comes into contact with screw 136, the screw is urged upwardly a distance corresponding to the radial difference between cam surface 126 and cam surface 124. Thus, the cam assembly and the following link and idler wheel are urged upwardly also. As the knob continues to be rotated and screw 136 approaches the point on the camming surface 124 which is furthest from the axis about which the cam rotates, roll pin 140 begins to enter into notch 117. As the roll pin enters into notch 117 the cam follower assembly is again rotated in a counter-clockwise position allowing the idler wheel to move in a direction toward stepped drive shaft 44, in a manner similar to the movement described for position 78. It is a feature of the invention that screw 136 may be micrometrically adjusted to control the vertical position at which resilient tire member 56 comes into contact with stepped sections 46 to 52. Such an adjustment is necessary to provide a minimum of clearance between the bottom surface of the rubber tire member 46 and the top surface of the shoulders of the stepped sections, thereby obviating the possibility of contact between the bottom surface of the rubber tire member and the top surface of the shoulders of the stepped sections, such a contact is undesirable because it would produce a friction that would tend to slow the rotation of the idler wheel.

As control knob 98 is further rotated in a clock-wise position, the above described movements repeat themselves and idler wheel 54 assumes the following 33 r.p.m. position as shown in FIG. 8, then the 16 r.p.m. position and finally, camming full circle, to the neutral position. At the 16 r.p.m., or slowest rotational movement of the record turntable, the idler wheel 54 has reached the height of its vertical movement and thereafter moves downwardly as the control knob is rotated in a clock-wise direction, back to the neutral position.

The operation as described is further explained with reference to Table 1, below, which illustrates the idler position and thus speed relative to the cam position.

*Table I*

| Turntable Speed | Effective Cam Notch | Effective Cam Surface | Location of Idler on Drive Shaft |
|---|---|---|---|
| Neutral | | 118 | |
| 16 | 121 | 120 | 46 |
| 33 | 119 | 122 | 48 |
| 45 | 117 | 124 | 50 |
| 78 | 116 | 126 | 52 |

Thus, the present invention provides a compact multi-speed control and drive mechanism relatively easy to manufacture due to the reduction in the complexity of the elements utilized, in particular the cam and cam follower assembly. By reducing the complexity of the elements, the cost of the manufacture is correspondingly lowered. In addition the mechanism is easier to service and repair, thereby reducing movement of the idler wheel.

I have described what I believe to be the best embodiments of my invention. I do not wish, however, to be confined to the embodiments shown, but what I desire to cover by Letters Patent is set forth in the following claims.

I claim:

1. In a multi-speed phonograph drive and control mechanism having an idler wheel, a turntable selectively engaged by said idler wheel, a motor driven stepped shaft selectively engaged by said idler wheel, a movable platform, the idler wheel being mounted on said movable platform, means to move the idler wheel between the steps of said motor driven stepped shaft and means to move the idler wheel out of engagement with the motor driven stepped shaft while the idler wheel is being moved between steps, the improvement comprising a rotatable cam, cam follower means secured to the idler platform for following the movement of said rotatable cam, a rotatable control member connected to said rotatable cam, said rotatable cam including a first continuous camming suface and a second continuous camming surface, said cam follower means including a first member in contact with said first camming surface and a second member in contact with the second camming surface, whereby the rotation of said rotatable control member rotates the cam to thereby drive the cam follower means, in turn imparting horizontal and vertical movement to the idler platform to thereby selectively engage and disengage the idler wheel from contact with the surfaces of the steps of said motor driven stepped shaft.

2. A multi-speed phonograph drive and control mechanism as in claim 1, wherein said rotatable cam includes means for locking the idler wheel in a selected position.

3. A multi-speed phonograph drive and control mechanism having a turntable journaled on a vertically extending turntable shaft, a vertically extending motor driven stepped drive shaft, an idler wheel journaled on an axially movable shaft and a floating link assembly, the axially movable shaft being mounted on the floating link assembly, the improvement comprising, cam follower means connected to the floating link assembly for causing vertical and lateral movement of the idler wheel, a rotatable cam, said cam having a first continuous camming surface and a second continuous camming surface, said surfaces being in sliding engagement with said cam follower means, the rotation of said cam providing selective registration of said idler wheel with predetermined sections of said stepped drive shaft.

4. A mechanism as in claim 3, wherein said cam follower means includes a plurality of integrally formed legs pivotally mounted on a cam follower shaft, a cam screw depending downwardly from a first one of said plurality of legs, said screw being in sliding engagement with said first camming surface, whereby the rotation of said cam provides vertical movement to said idler wheel through said cam screw, integrally formed legs and floating link assembly.

5. A mechanism as in claim 4, including a roll pin depending downwardy from a second one of said plurality of legs, said roll pin being in sliding engagement with said second camming surface whereby the rotation of said cam provides lateral movement to said idler wheel through said roll pin, integrally formed legs, and floating link assembly.

6. A multiple speed drive and control mechanism for a phonograph turntable comprising a vertically extending motor driven shaft having a plurality of stepped sections, a cam follower assembly pivotally mounted on a fixed upright shaft, spring means for urging said cam follower assembly in a downward direction, an idler wheel mounted on a cantilever arm, an end of said cam follower being pivotally mounted on an axially shiftable shaft affixed to the cantilever arm, means for urging said idler wheel into contact with the motor driven shaft, and rotatably continuous cam surfaces for providing such vertical and lateral movements to the idler wheel as to sequentially move the idler wheel axially from engagement with a stepped section of the motor driven drive shaft, vertically to a level with an adjoining stepped section, and then axially into engagement with the adjoining stepped section.

7. A multiple speed drive mechanism as in claim 6, wherein said cam follower assembly includes a plurality of legs, a cam screw adjustably mounted in a first one of said legs, said cam screw being in sliding engagement with said cam surfaces and adapted to transmit the vertical movements to the idler wheel from said cam surfaces, and a roll pin secured to a second one of said plurality of legs, said roll pin being in sliding engagement with said cam surfaces and adapted to transmit the lateral movements to the idler wheel from said cam surfaces.

8. A multiple speed drive mechanism as in claim 6, wherein said cam surfaces include a cam having a first continuous camming surface comprising a plurality of sections, each surface section at a different radial distance from the center of rotation of the cam.

9. A multiple speed drive mechanism as in claim 8, wherein said cam includes a second continuous camming surface spaced radially from and extending along the axis about which the cam rotates at varying axial distances.

10. A multiple speed drive mechanism as in claim 9, wherein said cam follower assembly includes a plurality of legs, a cam screw adjustably mounted in a first one of said plurality of legs and adapted to slidingly engage the first camming surface, and a roll pin secured to a second one of said plurality of legs and adapted to slidingly engage said second camming surface.

11. A multiple speed drive mechanism as in claim 10, wherein said cam means includes a knob shaft, a knob mounted on one end of said knob shaft, said cam being mounted on the other end of said knob shaft, and spring means for urging said roll pin into engagement with said second camming surface.

12. A multiple speed drive mechanism as in claim 11, wherein said cam includes a surface having a plurality of notches, and a fixed key adapted to engage said plurality of notches, one at a time, as the cam is rotated.

13. A multi-speed control and drive mechanism for a phonograph turntable as in claim 12, including a pair of ears depending downwardly from said mounting plate, said knob shaft being rotatably mounted on said ears, said cam including a cam plate having a raised detented surface integrally formed thereon and one of said ears having a key affixed thereto, said key being adapted to slidingly engage the detents in said raised surface as the cam is rotated.

14. A multi-speed control and drive mechanism for a phonograph turntable, comprising a vertically extending motor driven shaft having a plurality of stepped sections, a link member, an idler wheel mounted on the link member, an axially movable vertically extending link shaft, said link shaft being mounted upon said link member, spring means for urging the periphery of said idler wheel into contact with said motor driven shaft, a cam follower assembly, said cam follower assembly including three integrally connected horizontally disposed arm members, a mounting plate, a cam follower shaft vertically mounted upon said mounting plate, said cam follower assembly being in sliding engagement with said cam follower shaft, spring means for biasing said cam follower assembly downwardly towards said mounting plate, said link shaft being rotatably mounted in one of said horizontally disposed arm members, a knob shaft rotatably mounted on said mounting plate substantially parallel to the mounting plate, a manually operable knob mounted on one end of said knob shaft, an integral cam mounted on the other end of said knob shaft, said cam including a peripheral cam flange, said cam flange including an outer lobed surface, spaced at varying radial distances from the center of rotation of the cam, a cam follower screw adjustably mounted on the second of said horizontally disposed arm members, said cam follower screw adapted to slidingly engage the lobed surface of said cam flange, the rotation of said cam imparting a vertical movement to said cam follower assembly through said cam follower screw, said cam including an integrally formed notched rim cam surface, said rim cam surface being displaced radially from and axially along the axis about which said cam rotates, a roll pin mounted on the remaining one of said three horizontally disposed arm members, said roll pin adapted to slidingly engage said cam rim surface, the rotation of said cam tending to pivot said cam assembly as the roll pin engages and disengages the notches in said cam rim, a knob spring biased to urge said flange toward said roll pin, whereby the manual rotation of said knob imparts both a vertical and lateral movement to said idler wheel through the agency of the cam, cam assembly, link assembly, and idler wheel shaft to thereby selectively engage said plurality of stepped sections.

References Cited by the Examiner

UNITED STATES PATENTS

| | | | |
|---|---|---|---|
| 2,926,536 | 3/1960 | Bradley | 74—200 |
| 2,939,327 | 6/1960 | Staar | 74—200 |

DON A. WAITE, *Primary Examiner.*